(12) United States Patent
Liu et al.

(10) Patent No.: US 7,184,660 B2
(45) Date of Patent: Feb. 27, 2007

(54) METHOD AND SYSTEM FOR MONITORING PERFORMANCE OF OPTICAL NETWORK

(75) Inventors: Wen Liu, Nepean (CA); Paul David Obeda, Nepean (CA); Niranjan Vethanayagam, Nepean (CA); Dan Oprea, Kanata (CA)

(73) Assignee: Tropic Networks Inc., Kanata (CA)

( * ) Notice: Subject to any disclaimer, the term of this patent is extended or adjusted under 35 U.S.C. 154(b) by 667 days.

(21) Appl. No.: 10/136,407

(22) Filed: May 2, 2002

(65) Prior Publication Data

US 2003/0103252 A1  Jun. 5, 2003

Related U.S. Application Data

(63) Continuation-in-part of application No. 09/990,366, filed on Nov. 23, 2001, now Pat. No. 7,031,606.

(51) Int. Cl.
*H04B 10/08* (2006.01)
(52) U.S. Cl. ............... 398/13; 398/14; 398/17; 398/20; 398/23; 398/32; 398/34; 398/38; 398/79; 398/5; 398/9; 398/177; 398/200; 398/195; 398/196; 398/198
(58) Field of Classification Search .......... 398/51, 398/13, 14, 17, 20, 23, 32, 33, 34, 37, 38, 398/79, 5, 9, 177, 200, 195, 196, 198; 359/187, 359/124, 117
See application file for complete search history.

(56) References Cited

U.S. PATENT DOCUMENTS 5,513,029 A   4/1996  Roberts
5,654,816 A * 8/1997  Fishman ............... 359/349
5,745,274 A * 4/1998  Fatehi et al. ............ 398/198
6,108,113 A * 8/2000  Fee ....................... 398/16

(Continued)

FOREIGN PATENT DOCUMENTS

CA   2288463   5/2000

OTHER PUBLICATIONS

Hill, G.R., et al, "A Transport Network Layer Based on Optical Network Elements", Journal of Lightwave Technology, vol. 11, No. 5/6, May/Jun. 1003.

(Continued)

*Primary Examiner*—Hanh Phan
(74) *Attorney, Agent, or Firm*—Victoria Donnelly

(57) ABSTRACT

The invention describes methods and systems for monitoring the performance of an optical network by marking a group of optical signals with a set of identification tags which are unique to network characteristics. In the preferred embodiments, fiber identification (FID) and bundle identification (BID) tags are encoded into optical signals by marking an optical signal with low frequency dither tones whose frequencies are unique to the fiber section and to a bundle of fibers respectively. Detecting of the FID and BID tones provides more effective and accurate monitoring of performance of the optical network and allows determining of the network topology, e.g. paths of optical channels and traffic load through different fiber sections in the network. Other sets of hierarchically arranged identifiers encoded into optical signals have also been proposed, including band, conduit, city, region, country, etc. identifiers, as well as identifiers related to network security and service characteristics.

6 Claims, 7 Drawing Sheets

U.S. PATENT DOCUMENTS

| | | | |
|---|---|---|---|
| 6,757,057 B2 * | 6/2004 | Reepschlager | 356/73.1 |
| 6,873,797 B2 * | 3/2005 | Chang et al. | 398/51 |
| 7,031,606 B2 * | 4/2006 | Liu et al. | 398/13 |
| 2003/0067646 A1 * | 4/2003 | Wan et al. | 359/124 |
| 2004/0062548 A1 * | 4/2004 | Obeda et al. | 398/25 |
| 2004/0062549 A1 * | 4/2004 | Obeda et al. | 398/30 |

OTHER PUBLICATIONS

Heismann, Fred, et al, "Signal Tracking and Performance Monitoring in Multi-Wavelength Optical Networks", 22nd European Conference on Optical Communication —ECOC '96, Oslo.

* cited by examiner

US 7,184,660 B2

METHOD AND SYSTEM FOR MONITORING PERFORMANCE OF OPTICAL NETWORK

RELATED APPLICATIONS

This patent application is a Continuation-in-Part of the U.S. patent application to Wen Liu et al. entitled "Method and System for Monitoring Performance of Optical Network" Ser. No. 09/990,366 filed on Nov. 23, 2001 now U.S. Pat. No. 7,031,606.

FIELD OF THE INVENTION

This invention relates to optical networks, and in particular to methods and systems for monitoring performance of optical networks.

BACKGROUND OF THE INVENTION

It is a common practice in an optical network to introduce a signal tracking mechanism, which would allow the distinguishing and supervising of individual wavelength channels along the optical path. Commonly the tracking mechanism is implemented by modulation of a wavelength channel with a low frequency dither tone, which is unique to the transmitted channel and remains unchanged as the channel travels through the network. This approach has been described in several articles, patents and patent applications, some of which are listed below:

1. U.S. Pat. No. 5,513,029 to Kim Roberts et al;
2. Canadian Patent Application Serial No. 2,288,463 to James Harley;
3. A publication by Fred Heismann, Mohammad T. Fatehi, Steven K. Korotky and John J. Veselka entitled "Signal Tracking and Performance Monitoring in Multi-Wavelength Optical Networks", WeB.2.2., 22nd European Conference on Optical Communications, ECOC '96, Oslo, pp. 3.47–3.50; and
4. A publication by G. R. Hill, P. J. Chidgey, F. Kaufhold, et al, "A Transport Network Layer Based on Optical Network Elements", Journal of Lightwave Technology, Vol. 11, No. 5/6, May/June 1993, pp. 667–679.

Although the approaches described in the cited prior art provide useful information and identification of different optical signals (wavelengths channels) in a network, their origin and power levels, this information alone is limited and not sufficient for the efficient monitoring of the performance of the optical network.

Accordingly, there is a need in industry for the development of improved methods and systems for monitoring performance of optical networks, which would capture more information about the network and therefore would be more accurate and efficient.

SUMMARY OF THE INVENTION

An object of this invention is to provide methods and apparatus for monitoring performance of optical networks, which would overcome some or all of the disadvantages of the monitoring techniques described above.

According to one aspect of the invention there is provided a method for monitoring performance of an optical network, comprising the steps of:

selecting a group of optical signals traveling in the network;

marking each of the optical signals in the selected group with same set of identification tags, each identification tag being unique to a network characteristic; and detecting the set of identification tags at various locations in the network.

Conveniently, the step of marking comprises making each of the optical signals with the set of tags arranged in a hierarchical manner, wherein each tag is dependent upon the tag above it.

Conveniently, the step of marking may further comprise marking each of the optical signals with one or more tags unique to the network characteristics selected from the following:

source of the optical signal,
destination of the optical signal; and
routing information for the optical signal.

Alternatively, the step of marking may comprise marking each of the optical signals with the set of tags unique to the network service characteristics, e.g. tags related to one or more of the following:

Quality of service;
Class of service;
Bandwidth; and
Links for priority restoration downstream of a monitoring location.

When arranged in a hierarchical manner, identification tags may be selected so as to uniquely identify the origin of the group of optical signals, e.g. to identify one or more of the following:

optical signal identification;
optical band identification;
optical fiber identification;
optical bundle identification;
optical conduit identification;
geographical city identification;
geographical region identification;
geographical country identification;
geographical continent identification; and
geographical part of the network identification.

Alternatively, the step of marking may comprise marking each of the optical signals with a tag uniquely identifying credentials for the group of optical signals for security purposes.

Conveniently, in the method described above, the step of marking comprises modulating the optical signal so that identification tags are encoded onto the optical signal. The step of modulating may comprise modulating the optical signal with the identification tags, which are low frequency dither signals, e.g. performed by an amplitude modulation.

Alternatively, the step of modulating may be performed by one or more of the following types of modulation: frequency modulation, phase modulation and polarization modulation. In one of the embodiments of the invention the step of modulating the optical signal with the low frequency dither signal comprises modulating with the low frequency dither tone whose frequency is unique to the fiber section.

Conveniently, in the method described above, the step of detecting the set of identification tags comprises detecting the tags at a network node. In more detail, the step of detecting comprises:

tapping a portion of the optical signal; and
determining one or more of the following parameters from the tapped portion of the optical signal:
(a) frequency of the dither signal;
(b) depth of modulation of the optical signal introduced by the dither signal; and (c) combined power of dither signals at the dither frequency.

According to another aspect of the invention there is provided a method for monitoring performance of an optical network, comprising the steps of:

marking an optical signal, traveling through a section of fiber, with a fiber identification (FID) tag which is unique to the fiber section; and detecting the fiber identification tag at various locations in the network.

Conveniently, the step of detecting further comprises:

tapping a portion of the optical signal; and determining one or more of the following parameters from the tapped portion of the optical signal:

(a) frequency of the FID signal;

(b) depth of modulation of the optical signal introduced by the FID signal; and (c) combined power of FID signals at the FID frequency.

The step of marking the optical signal may be performed so that selected tags, e.g. FID tags, are accumulated in the optical signal as the signal travels in the network. Alternatively, it may be arranged that the step of marking the optical signal is performed so that one of the some and all of the previously introduced tags are removed from the optical signal.

According to another aspect of the invention there is provided a method of detecting a fiber failure in an optical network, comprising the steps of:

monitoring performance of an optical network by introducing a FID tag as described above; and indicating the possibility of fiber failure for the fiber section whose fiber identification tag is not present.

The method of detecting the fiber failure may further comprise the steps of:

measuring power levels of FID tones at FID frequencies; and indicating the possibility of one or more of the following:

a fiber section failure if the FID tone for the fiber section is not present;

an amplifier failure if power levels of combined FID tones at different frequencies decrease substantially uniformly;

a transponder failure if the power level of the corresponding FID tone decreases provided that no channels are being dropped from the respective network node; and adding or dropping wavelength channels to fiber sections if power levels of the corresponding FID tones change.

According to yet another aspect of the invention there is provided a system for monitoring performance of an optical network, comprising:

means for marking an optical signal, traveling through a section of fiber, with a fiber identification tag which is unique to the fiber section; and means for detecting the fiber identification tag at various locations in the network.

According to yet another aspect of the invention there is provided a system for monitoring performance of an optical network, comprising:

means for marking each signals in a selected group of optical signals traveling in the network with same set of identification tags, each tag being unique to a network characteristic; and means for detecting the identification tags at various locations in the network.

In the systems described above, the means for marking comprises an encoder for encoding a low frequency dither signal onto the optical signal, and the means for detecting comprises a decoder for decoding said low frequency dither signal. The encoder may comprise one of the following: high-speed e-VOA (variable optical attenuator), Mach-Zehnder modulator and electro-absorption modulator.

According to one more aspect of the invention there is provided a method for monitoring performance of an optical network, comprising the steps of:

marking an optical signal, traveling through a section of fiber in a bundle of fibers, with a bundle identification (BID) tag which is unique to the bundle section; and detecting the bundle identification tag at various locations in the network.

Conveniently, the step of marking comprises modulating the optical signal with a low frequency dither signal, whose frequency is unique to the bundle section.

According to still one more aspect of the invention there is provided a method for determining a topology of an optical network, comprising the steps of:

marking an optical signal with a channel identification (CID) tag which is unique to the optical signal;

marking said optical signal, traveling through a fiber section, with a fiber identification (FID) tag which is unique to the fiber section; and detecting the tags at various locations in the network, thereby determining a path of said optical signal in the network.

The method for determining a topology of an optical network may comprise the step of marking the optical signal, traveling through a fiber section in a bundle section, with a bundle identification (BID) tag which is unique to the bundle section, the step of marking with the BID tag being performed before the step of detecting.

The methods and systems for monitoring performance of optical networks described above provide the following advantages. Introduction of network characteristics related to identification tags into wavelength channels and detection of their presence and power levels in the network allows more effective and accurate monitoring of the performance of the entire network. In many situations, when specific identifier information is required, e.g. fiber and/or fiber bundle information, it simplifies the monitoring process by allowing the measurement of a fewer number of parameters. Additionally, it allows discovery of the topology of the network which otherwise would not be possible, e.g. to determine paths of individual channels in the network, traffic load and wavelengths channels traveling through particular fiber and bundle sections and to monitor various scenarios of network failure or changes introduced to the network.

BRIEF DESCRIPTION OF THE DRAWINGS

Embodiments of the invention are described below by way of example only. Reference is made to the accompanying drawings in which.

DETAILED DESCRIPTION OF THE PREFERRED EMBODIMENTS

The first embodiment of the invention describes a method and apparatus for monitoring performance of a dense wavelength division multiplexing (DWDM) network by introducing a fiber identification (FID) tone, or fiber identification tag, associated with a section of fiber between the two nodes in the network. The FID tag is encoded onto a group of optical signals (wavelength channels) traveling through the section of the fiber, the tag being unique to the fiber section. Optionally the FID tag may be introduced into all or only selected optical signals traveling through the fiber section.

Figure 1:
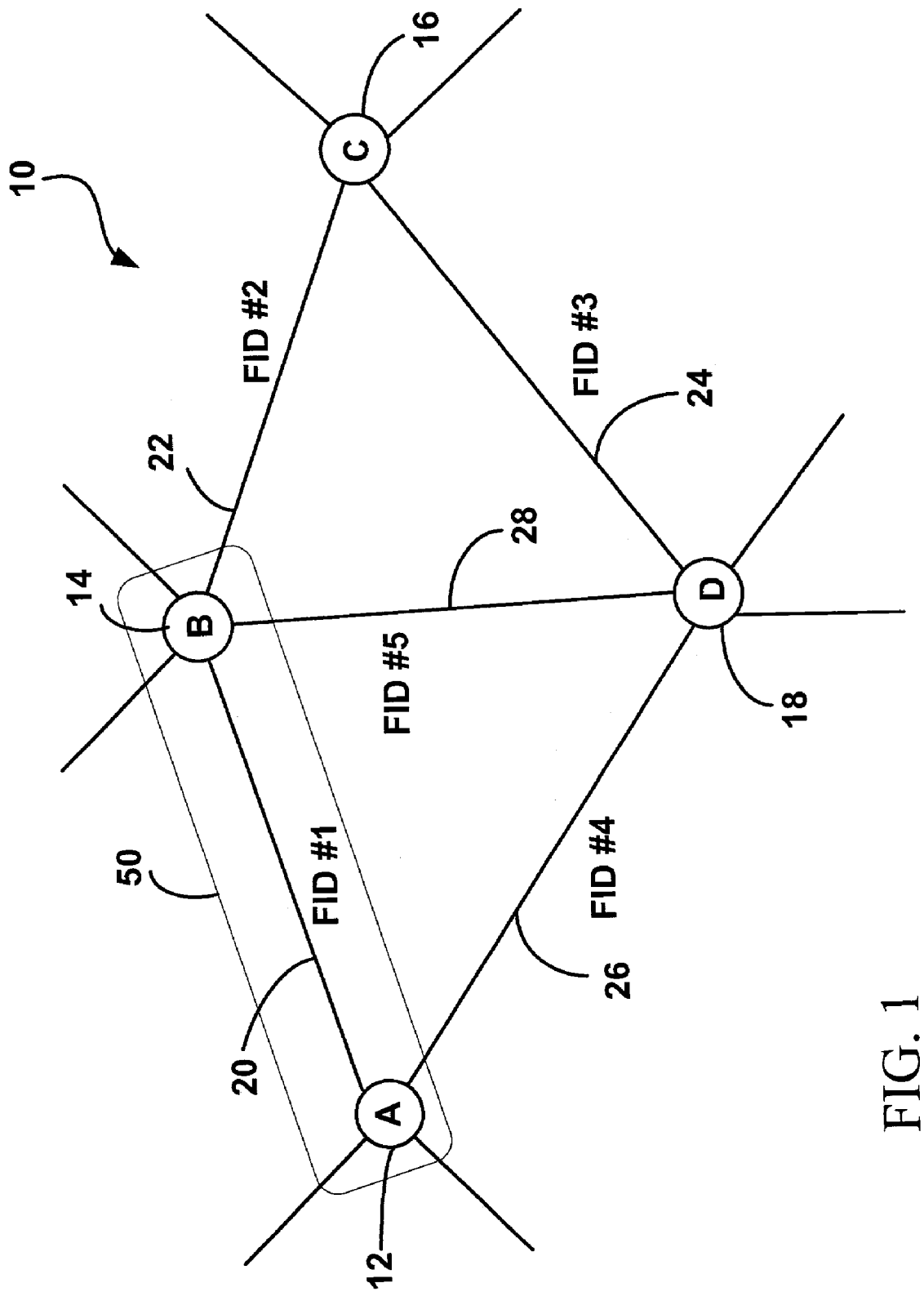
FIG. 1 is a schematic diagram of an optical network, illustrating introduction of a fiber identification tag according to a first embodiment of the invention.

By a way of example, FIG. 1 illustrates an optical network 10 having a plurality of network nodes, four of them being shown in FIG. 1 as nodes A, B, C and D and designated by reference numerals 12, 14, 16 and 18 respectively. For the sake of simplicity, each pair of nodes is connected with one fiber section only, thus five fiber sections in total connecting the four nodes of the network 10 and being shown in FIG. 1. In more detail, fiber section 20 connects nodes 12 and 14, fiber section 22 connects nodes 14 and 16, fiber section 24 connects nodes 16 and 18, fiber section 26 connects nodes 18 and 12, and fiber section 28 connects nodes 14 and 18. In the first embodiment, each wavelength channel entering into a fiber section is marked with the FID tag. The tag is a low frequency dither tone encoded onto the channel, having a frequency preferably about below 1 MHz and a shallow modulation depth, e.g. 1–5% of the optical channel power level. This FID tone remains encoded onto the wavelength channel up until the channel reaches its final destination, while additional FID tones are encoded onto the channel if the channel travels through more than one fiber section in the network. For example, if a wavelength channel travels through all five fiber sections 20 to 28 shown in FIG. 1, the channel is encoded with five fiber identification tones FID #1 to FID #5, each tone having a unique frequency corresponding to the respective fiber section.

Figure 2:
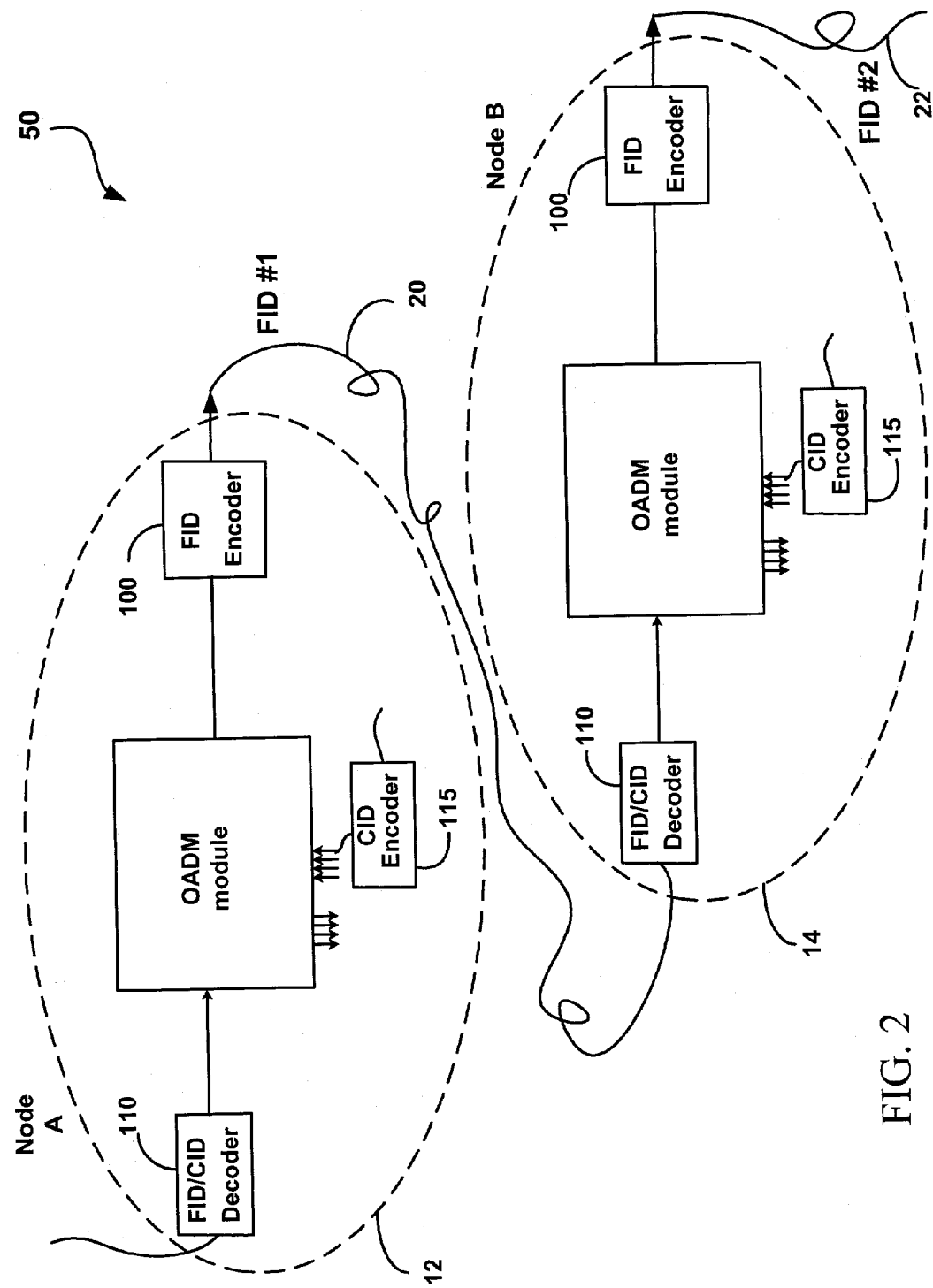
FIG. 2 is a diagram, illustrating placement of fiber identification encoder and decoder in a network node.

The fiber identification tones are detected at various locations in the network, e.g. conveniently at network nodes. FIG. 2 illustrates a section 50 of the network 10 including nodes 12 and 14 in more detail. Each node has a fiber identification encoder 100 for modulating the channel, leaving the node and entering into the fiber section, with the FID tone, and a fiber identification decoder 110 for detecting the encoded information when the channel enters into another network node. Conveniently, the same decoder 110 can be used for detecting both fiber identification (FID) and channel identification (CID) tones, wherein CID is another dither tone, which is unique to the channel and may be optionally encoded onto the channel. Different encoders 100 and 115 are required for encoding of FID and CID tones respectively.

Figure 3:
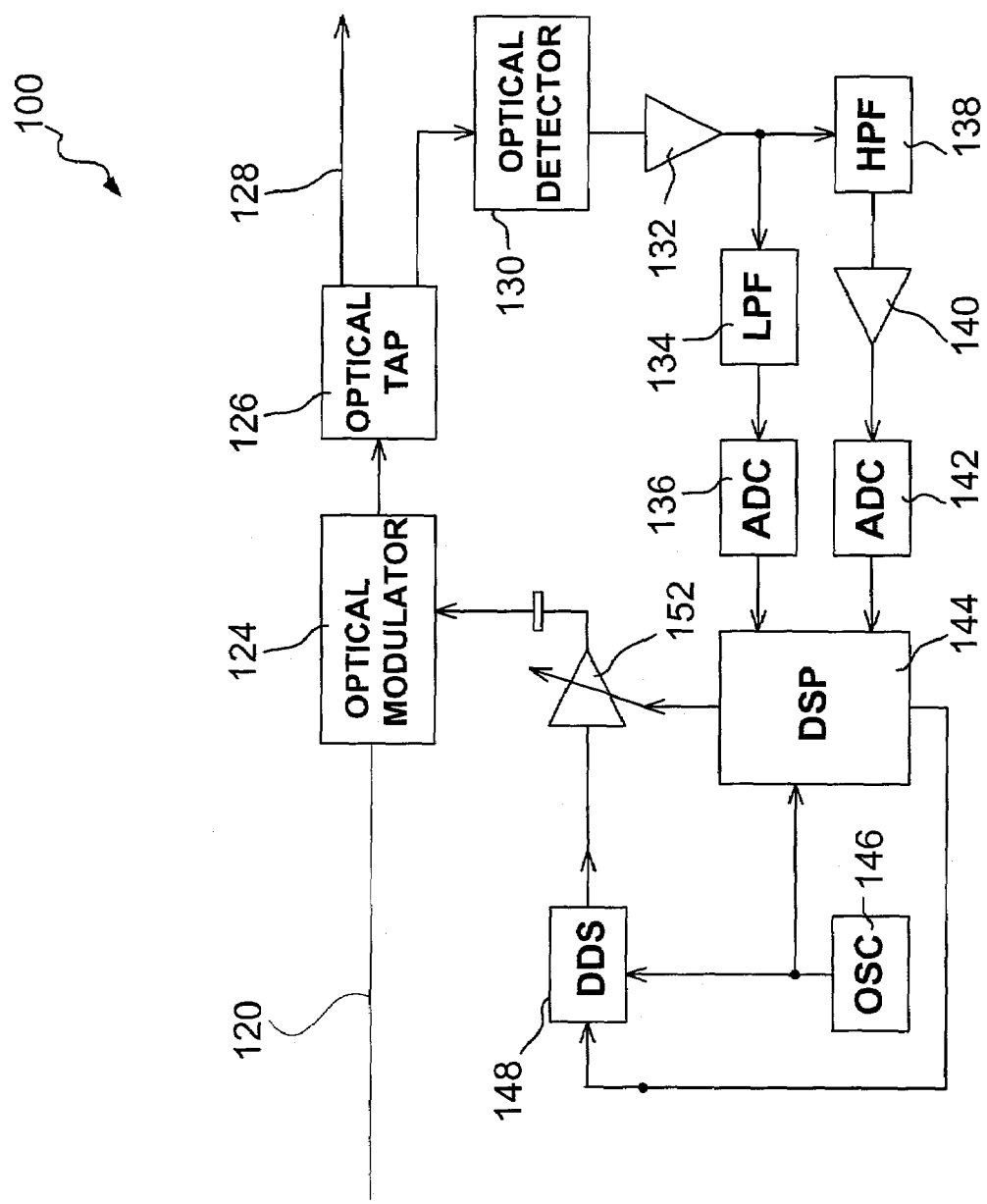
FIG. 3 is a schematic block diagram of the fiber identification encoder.

FIG. 3 illustrates one form of the FID tone encoder 100, which can be used in the embodiment of the invention. Referring to FIG. 3, an optical channel is provided on an optical fiber or path 120 from a modulated laser source (not shown), and is supplied via an optical modulator 124 and an optical tap 126 to an ongoing optical path 128. The optical modulator 124 is preferably an e-VOA (variable optical attenuator), which provides amplitude modulation of the optical channel for fiber identification as described below.

The optical tap 126 supplies a small portion, e.g. 5%, of the optical output of the modulator 24 to an optical detector 130, whose electrical output is amplified by an AGC (automatic gain controlled) amplifier 132. An output of the amplifier 132 is supplied via a low pass filter (LPF) 134 to an analog-to-digital converter (ADC) 136, and via a band pass or high pass filter (HPF) 138 and an amplifier 140 to an ADC 142. The ADCs 136 and 142 produce digital signals, which are supplied to a digital signal processor (DSP) or microprocessor 144.

An oscillator 146 provides a stable source of a signal, for example at a frequency of 50 MHz, which is supplied to the DSP 144 and to a direct digital synthesizer (DDS) or other programmable frequency source 148. DDS 148 is arranged to produce, under programmed control of the DSP 144, a respective dither tone. An output of the DDS 148 is coupled via a controlled gain amplifier 152 and a capacitive coupling to a control input of the optical modulator 124. The gain of the amplifier 152 is controlled by the DSP 144.

In operation, the DDS 148 is arranged to produce continuously a dither tone to be used for identification of the respective fiber section, which will be modulated (encoded) onto the wavelength channel by the optical modulator 124.

The LPF 134 and ADC 136 provide a DC feedback path to the DSP 144, and the HPF 138, amplifier 140, and ADC 142 provide a feedback path to the DSP 144 for the frequency band of the dither tones, in accordance with which the DSP 144 controls the gain of the amplifier 152 to maintain a desired constant depth of modulation by the optical modulator 124. For example, the modulation depth may be about 4%. The use of a constant modulation depth for fiber identification facilitates determining optical power levels in the WDM network in known manner.

Figure 4:
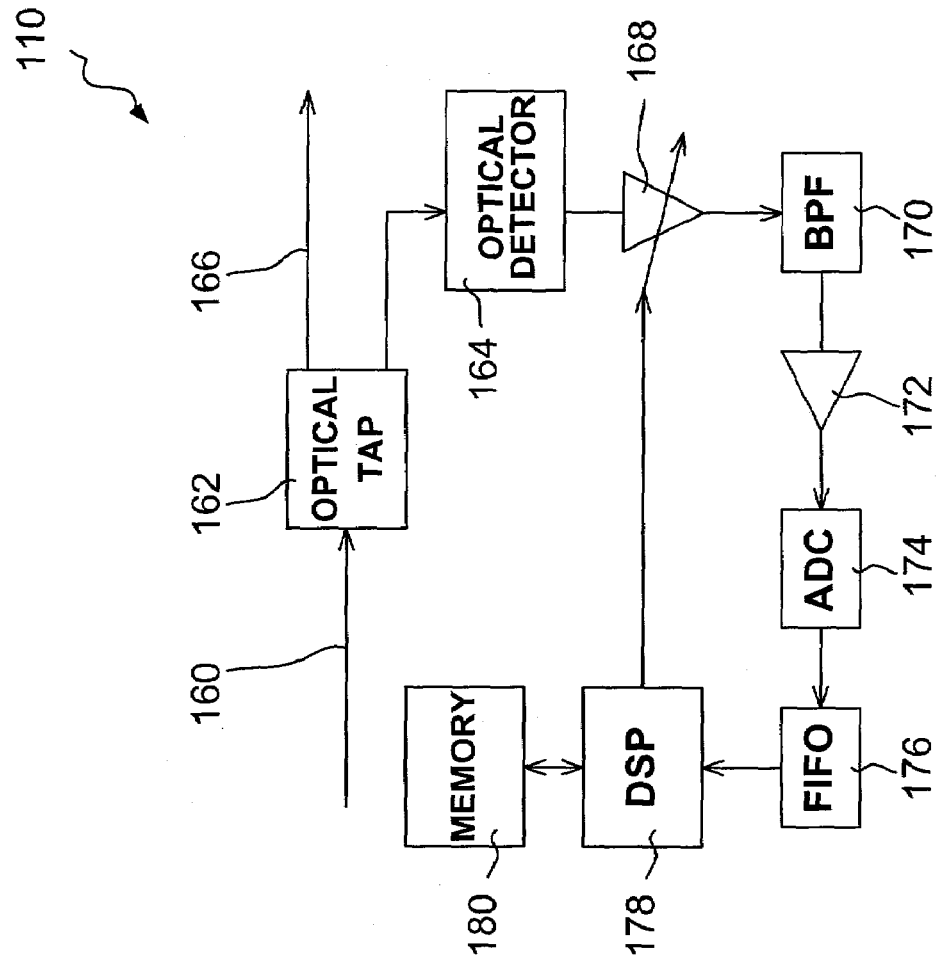
FIG. 4 is a schematic block diagram of the fiber identification decoder.

FIG. 4 illustrates a corresponding FID detector 110 of FIG. 2. Referring to FIG. 4, an optical tap 162 supplies a small portion, e.g. 5%, of an optical signal on the path 160 to an optical detector 164, and supplies most of the optical signal power to an ongoing optical path 166. An electrical output of the optical detector 164 is amplified by a controlled gain amplifier 168, an output of which is supplied via a band pass filter (BPF) 170 and an amplifier 172 to an ADC 174. The BPF 170 has a pass band including the dither tone frequency range. The ADC 174 produces a digital signal, which represents detected dither tones and is supplied via a FIFO (first-in, first-out store) 176 to a digital signal processor or microprocessor 178. The microprocessor 178, which has an associated memory 180, controls the gain of the amplifier 168 in accordance with the power of the optical signal on the path 160.

The DSP 178 operates in known manner to perform Fast Fourier Transform (FFT) processing of the digital signals provided by the ADC 174, using the memory 180 for this FFT processing to detect dither tone modulation of the optical signal on the optical path 160 with the FIFO 176 ensuring that data is not lost during FFT processing by the microprocessor 178. This determines the respective dither tones, and hence the optical fiber identification, in one FFT operation in many instances of typical optical signal power levels.

Figure 5:
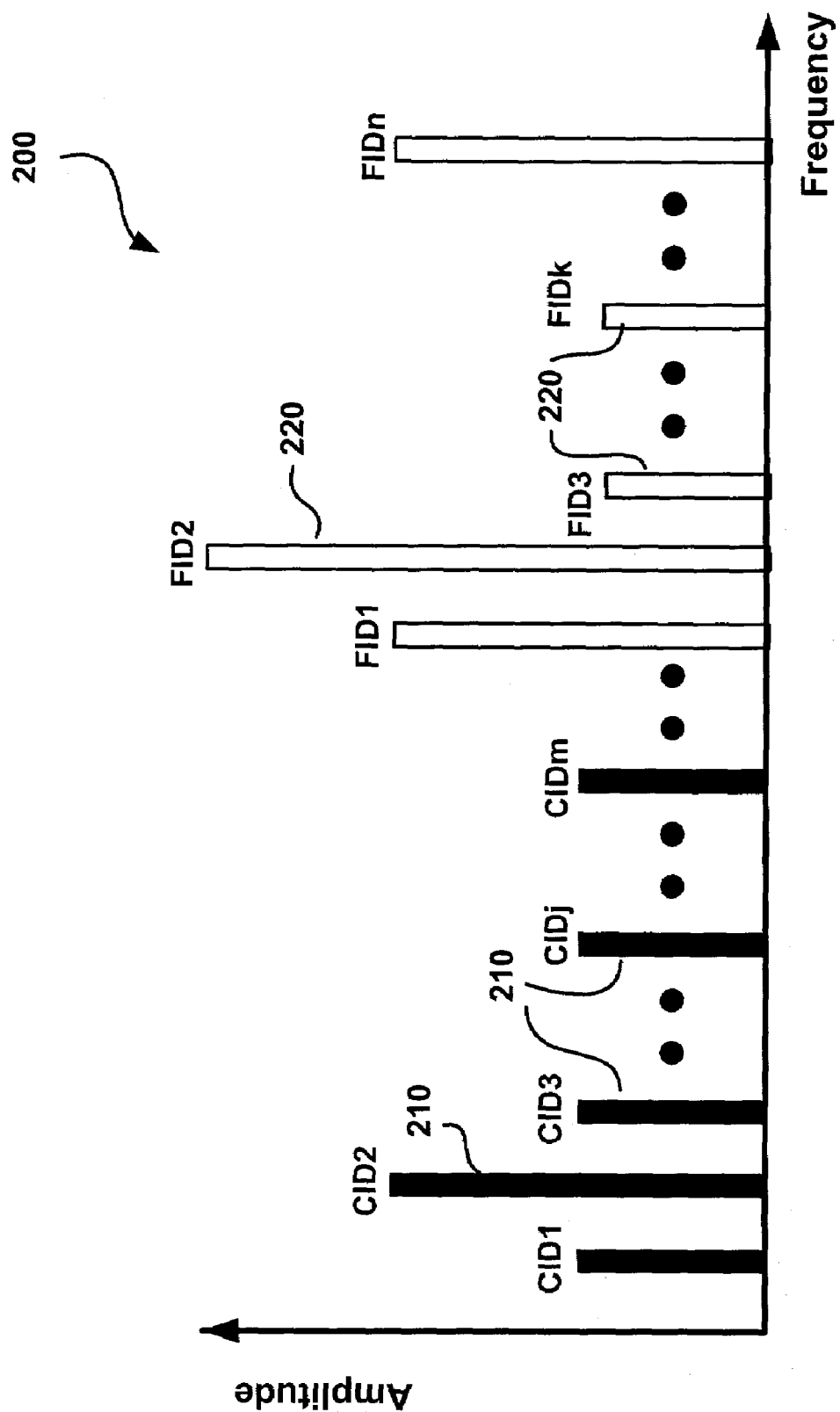
FIG. 5 is a diagram illustrating a Fourier Transform spectrum detected by the decoder of FIG. 4.

A typical Fast Fourier transform (FFT) spectrum 200 received after-the FID/CID decoder 110 is shown in FIG. 5. It is assumed that both channel identification (CID) and fiber identification (FID) dither tones have been encoded onto the wavelength channels, and that regions of the spectrum occupied by CID and FID tones do not overlap. The FFT spectrum 200 shows power levels 210 for individual wavelength channels marked as $CID_j$, wherein j=1, ... m designates corresponding wavelength channels, and combined power levels 220 of FID tones at FID frequencies. Each FID tone power level measured at a particular FID frequency is comprised of FID tones assigned to the wavelength channels traveling through the corresponding fiber sections marked with this FID tone. The combined power levels of FID tones at FID frequencies are marked as $FID_k$, wherein index k=1, . . . m designates fiber sections. The spectrum allows for an easy and approximate visualization of traffic load through different fiber sections by comparing power levels at different FID frequencies. If power levels of the channels are equalized, then higher power levels at certain FID frequencies indicate that a higher number of wavelength channels travel through the fiber sections corresponding to these FID tones. If power levels for different channels are not equalized, the FFT spectrum would allow for approximate evaluation of relative traffic load through different fiber sections via approximate comparison of power levels at different FID frequencies. More detailed evaluation of a network topology, capturing information as to which channels are traveling through which fiber sections in the network at any given instant in time, would require a monitoring the presence of both FID and CID tones at various network nodes.

By monitoring the FID tones or combination of the FID/CID tones, it is possible to monitor the performance of the entire network and/or its elements. For example, indication of the possibility of one or more of the following events in the network can be identified:

a fiber section failure if the FID tone for the fiber section is not present;

an amplifier failure if power levels of combined FID tones at different frequencies decrease substantially uniformly;

a transponder failure if the power level of the corresponding FID tone decreases provided that no channels are being dropped from the respective network node; and adding or dropping wavelength channels to fiber sections if power levels of the corresponding FID tones change.

Additionally, periodic monitoring of the total aggregate power of all FIDs may allow detection of slow degradations in the network.

Figure 6:
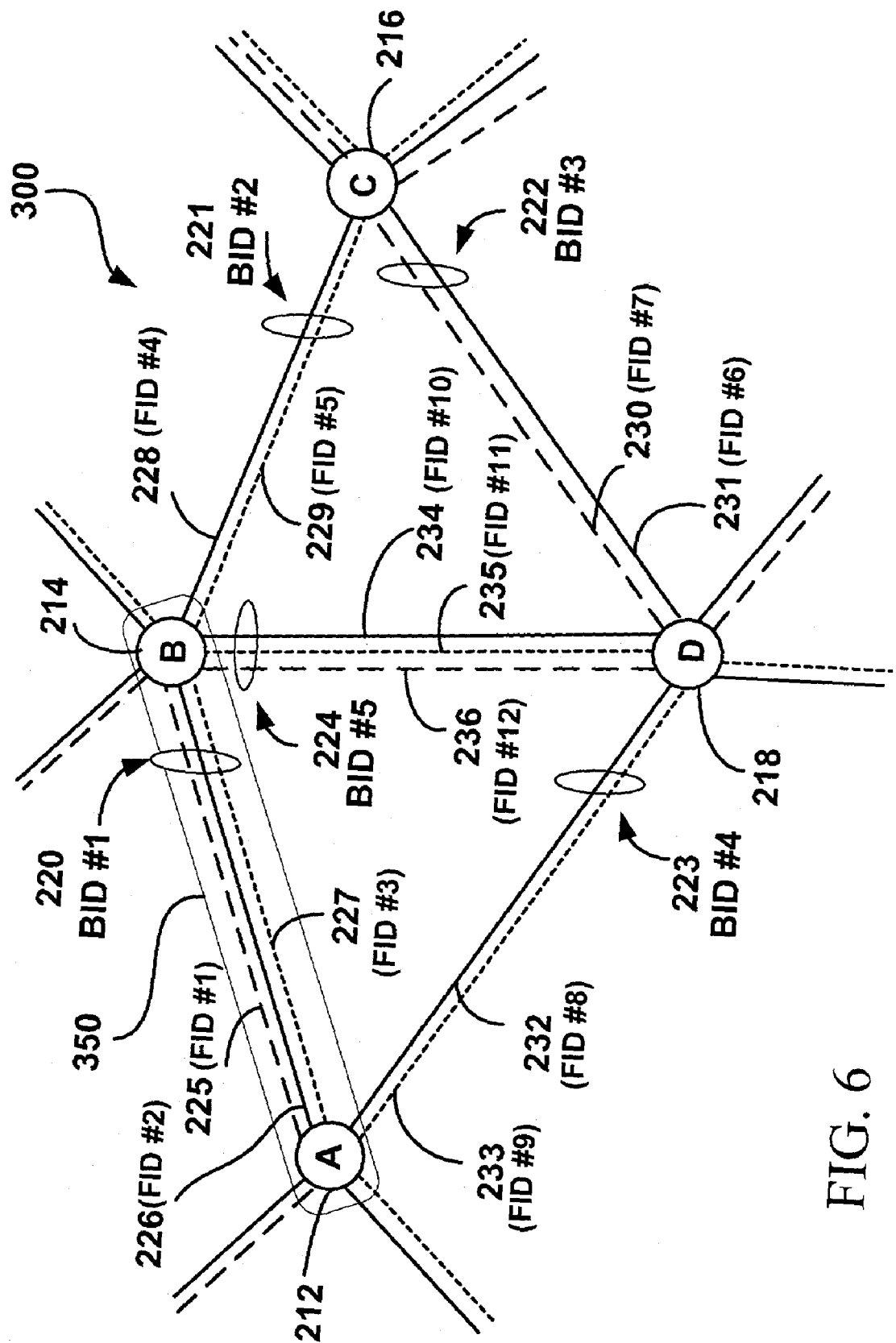
FIG. 6 is a schematic diagram of an optical network, illustrating introduction of a bundle identification tag according to a second embodiment of the invention.

Table 1 summarizes the comparison of the network performance monitoring capabilities by monitoring CID, FID and combined CID and FID tones.

reference numerals 212, 214, 216 and 218 respectively. The network 300 of the second embodiment is similar to the network 10 of the first embodiment except for the pairs of nodes now being connected with bundles of fibers, each bundle having more than one fiber section. Five bundle sections 220, 221, 222, 223 and 224 connecting the four nodes of the network 300 are shown in FIG. 6. In more detail, the bundle section 220, including fiber sections 225, 226 and 227, connects nodes 212 and 214; bundle section 221, including fiber sections 228 and 229, connects nodes 214 and 216; bundle section 222, including fiber sections 230 and 231, connects nodes 216 and 218; bundle section 223, including fiber sections 232 and 233, connects nodes 218 and 212; and bundle section 224, including fiber sections 234, 235 and 236, connects nodes 214 and 218. Each optical signal (wavelength channel) traveling through a bundle section is marked with a unique bundle identification (BID) dither tone associated with the bundle section. The fibers in a bundle are separated at each network node, and each fiber is encoded (modulated) with a unique lower frequency BID dither tone (preferably <1 MHz) having shallow modulation depth, e.g. 1–5% so that the frequency of the dither identifies the particular bundle of fibers. Optionally, an additional FID tone can be encoded onto the wavelength channel in a manner described above with reference to the first embodiment of the invention, thus each channel carrying two identification tones, a BID tone, and a FID tone. Further to the above, an optional CID tone can be encoded onto the optical signal in addition to the FID and BID tones.

Figure 7:
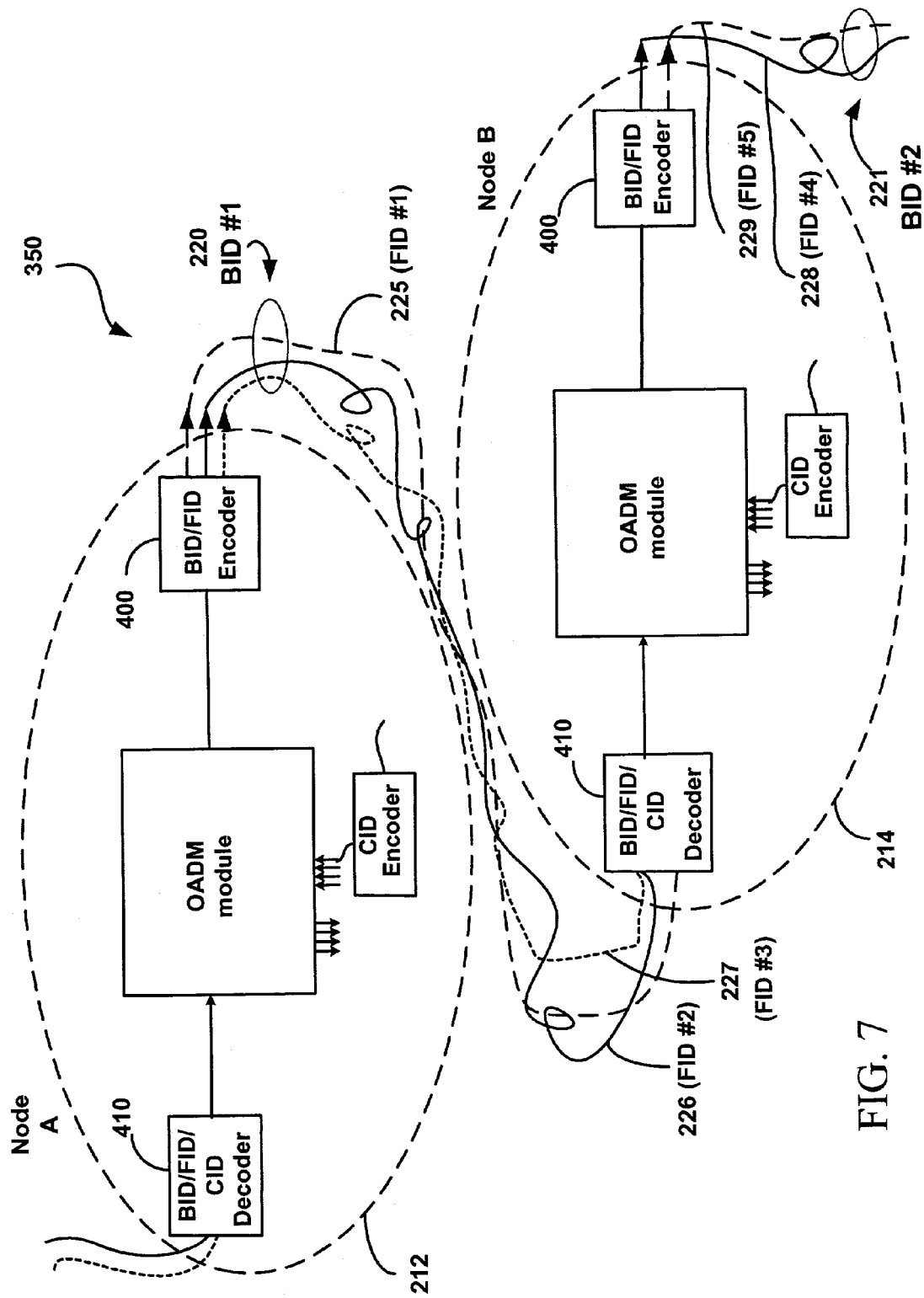
FIG. 7 is a diagram, illustrating placement of a bundle identification encoder and decoder in a network node.

FIG. 7 illustrates a segment 350 of the network 300, which includes nodes 212 and 214, their internal structure and placement of BID/FID encoders 400 and decoders 410 inside the nodes. For simplicity, only one fiber out of several fibers entering and leaving nodes 212 and 214 is shown inside the nodes 212 and 214. Encoding of the BID tone is performed similar to that of the FID tone as described above. Each node has a bundle identification encoder 400 for modulating the channel, leaving the node and entering into a new bundle section, with the BID tone, and a bundle identification decoder 410 for detecting the encoded BID

TABLE 1

Application of FID and CID tones for monitoring performance of a network

|  | Channel present or not; | Traffic or path of each | Fault indicating when malfunction happens | Detecting where | Power management | |
|---|---|---|---|---|---|---|
|  | Channel power monitoring | channel in a network | Trans-ponder | Fault Fiber location | channels are added in network | For each channel | For each fiber section |
| CID | Yes |  | Yes |  | Yes |  |  |
| FID |  |  | Yes | Yes | Yes |  | Yes |
| CID + FID | Yes | Yes | Yes | Yes | Yes | Yes | Yes |

The second embodiment of the invention describes a method and apparatus for monitoring performance of a dense wavelength division multiplexing (DWDM) network by introducing a bundle identification (BID) tone, or bundle identification tag, associated with a bundle (cable) of fibers between the two nodes in the network, where each bundle can carry hundreds of individual fibers.

By a way of example, FIG. 6 illustrates an optical network 300 having a plurality of network nodes, four of them being shown in FIG. 6 as nodes A, B, C and D and designated by information when the channel enters into another node in the network. Conveniently, the same decoder 410 can be used for detecting all three BID, FID and CID tones as illustrated in FIG. 7. BID encoding can be done either in a separate BID encoder, or in a combined BID/FID encoder 400 as shown in FIG. 7. The internal structure and operation of the BID encoder and decoder is similar to that of the FID encoder and decoder shown in FIGS. 3 and 4 respectively and described above with regard to the first embodiment. Conveniently, it is arranged so that spectral ranges for FID, BID and CID tones do overlap or interleave with each other. Conveniently, BID tones can be added to wavelength channels traveling through all or only selected fiber bundles in a network, and BID tones can be introduced as unique identifiers or along with other identification tones. Optionally, BID tones can be either accumulated in the wavelength channel as the channel travels through more than one bundle section, or BID tones can be added to the channel and/or removed from the channel at network nodes as required, see e.g. a publication by Fred Heismann (reference #3) cited in the Background section above. If all three BID, FID and CID tones are being encoded onto wavelength channels and detected at various locations in the network, the information collected about the network at any given instant of time can be even more complete and accurate.

Thus, a method and system for monitoring performance of an optical network by marking a selected group of wavelength signals with a set of hierarchically arranged network characteristics identifiers (fiber section identification tones and bundle section identification tones) have been described.

Although the above embodiments describe introduction of FID and BID tones only, it is contemplated that other identification tags uniquely related to network characteristics may also be introduced. If required, the tags may be arranged in a hierarchical manner, wherein each tag is dependent upon the tag above it. A example of hierarchically arranged tags may be tags identifying the origin of the group of optical signals, e.g. geographical origin of the signals, which may include optical band identification, optical fiber identification, optical bundle identification, optical conduit identification, geographical city identification, geographical region identification, geographical country identification, geographical continent identification, a part of the network, or any subset of this or similar hierarchy.

Alternatively, the set of the identification tags may be applied for a specific purpose, e.g. to identify the source or destination (or both), or intended or actual routing for the signal or selected group of signals.

Other such purposes may include marking of optical signals with the set of tags unique to the network service characteristics, e.g. quality of service, class of service, bandwidth reservation, or links for priority restoration downstream of a monitoring location.

Unique common identification tags may also be applied to multiple entities with common characteristics, e.g. entities within the same part of a network may have a common ID applied to each such entity, or a network operator may apply a common ID to each of their selected entities for identification or other purposes, or a network operator may apply common identifiers to interfaces destined for the same customer or customer group.

Unique identification tags may also be introduced for security purposes, e.g. the tags may uniquely identify presentation credentials for the group of optical signals, wherein connection (or access) in the network is granted only when the signals are encoded with these presentation credentials tones.

Further modifications can be made to the embodiments described above. For example, introduced identifications tags can be used separately, in combination with each other, or in combination with other tones to provide more information about the network performance. Identification tags can be added and removed at network nodes, or accumulated in the wavelength channel encoding as the channel travels through the network to its final destination or through only a section of its path in the network. Identification tones may be encoded into optical signals as continuous tones, or they may have a tone pattern which may be recovered, in either frequency or time domain.

While the embodiments of the invention have been described with regard to the amplitude modulation of the wavelength channel to introduce identification tones, it is also contemplated that other known types of modulation can be also used to introduce network characteristics related identification tags, e.g. phase modulation, frequency modulation or polarization modulation.

In the embodiments described above, introduction of identification tags (marking of different fiber and bundle sections) has been performed with dither tones having different frequencies. Alternatively, other ways of introducing identification tones can also-be employed, e.g. marking fiber/bundle sections with same frequency, but different modulation depths or different power levels of the dither tones, or combination thereof.

It is worth mentioning that in the embodiments of the invention the term "fiber section" or "fiber" means the length of fiber between the two nodes in the network, wherein the "node" means a location in the network where channels are dropped or added to the network. Similarly, the term "bundle section" or "bundle" means the length of fiber bundle between the two nodes.

While the FID/BID encoder of the preferred embodiment includes a high speed e-VOA (Variable optical attenuator) as an optical modulator, it is also contemplated that other types of modulators suitable for encoding fiber and bundle ID information are also possible, some examples of which include a Mach-Zehnder or EA (electro-absorption) type external modulators. The advantage of the external modulators is that they could provide higher bit rate so that more information could be encoded into the dither tones. Conveniently, some or all of the optical auxiliary channel (OAC) information could also be included into the dither tones if required.

The embodiments of the invention provide the following advantages. Introduction of the set of identification tags related to network characteristics into a group of wavelength channels and detection of their presence and power levels in the network allows more effective and accurate monitoring of the performance of the entire network, and in many cases requires monitoring of fewer number of dither tones. Additionally, it allows discovery of the topology of the network which otherwise would not be possible, e.g. to determine paths of individual channels in the network, traffic load and wavelengths of channels traveling through particular fiber and bundle sections and to monitor various scenarios of network failure or changes.

Although specific embodiments of the invention have been described in detail, it will be apparent to one skilled in the art that variations and modifications to the embodiments may be made within the scope of the following claims.

What is claimed is:

1. A method for monitoring performance of an optical network, comprising the steps of:
   selecting a group of optical signals traveling in the network;
   marking each of the optical signals in the selected group with a set of identification tags, each identification tag being unique to a network characteristic; and
   detecting the set of identification tags at various locations in the network;

the step of marking comprising marking an optical signal, traveling through a section of fiber, with a fiber identification (FID) tag which is unique to the fiber section; and the step of detecting comprising detecting the fiber identification tag at various locations in the network;

wherein the step of marking comprises modulating the optical signal so that identification tags are encoded onto the optical signal;

wherein the step of modulating comprises modulating the optical signal with the identification tags, which are low frequency dither signals;

wherein the step of modulating the optical signal with the low frequency dither signal is performed by an amplitude modulation;

wherein the step of detecting comprises:

tapping a portion of the optical signal; and determining one or more of the following parameters from the tapped portion of the optical signal:

(a) frequency of the dither signal;

(b) depth of modulation of the optical signal introduced by the dither signal; and (c) combined power of dither signals at the dither frequency.

2. A method for monitoring performance of an optical network, comprising the steps of:

selecting a group of optical signals traveling in the network;

marking each of the optical signals in the selected group with a set of identification tags, each identification tag being unique to a network characteristic; and detecting the set of identification tags at various locations in the network;

the step of marking comprising marking an optical signal, traveling through a section of fiber, with a fiber identification (FID) tag which is unique to the fiber section; and the step of detecting comprising detecting the fiber identification tag at various locations in the network;

wherein the step of detecting comprises:

tapping a portion of the optical signal; and determining one or more of the following parameters from the tapped portion of the optical signal:

(a) frequency of the FID signal;

(b) depth of modulation of the optical signal introduced by the FID signal; and (c) combined power of FID signals at the FID frequency.

3. A method as described in claim 2, wherein the step of marking the optical signal is performed so that selected FID tags are accumulated in the optical signal as the signal travels in the network.

4. A method as described in claim 2, wherein the step of marking the optical signal is performed so that one of the some and all of the previously introduced FID tags are removed from the optical signal.

5. A method for monitoring performance of an optical network, comprising the steps of:

selecting a group of optical signals traveling in the network;

marking each of the optical signals in the selected group with a set of identification tags, each identification tag being unique to a network characteristic; and detecting the set of identification tags at various locations in the network;

the step of marking comprising marking an optical signal, traveling through a section of fiber in a bundle of fibers, with a bundle identification (BID) tag which is unique to the bundle section; and the step of detecting comprising detecting the bundle identification tag at various locations in the network;

wherein the step of detecting comprises:

tapping a portion of the optical signal; and determining one or more of the following parameters from the tapped portion of the optical signal;

(a) frequency of the BID signal;

(b) depth of modulation of the optical signal introduced by the BID signal; and (c) combined power of BID signals at the BID frequency.

6. A method as described in claim 5, wherein the step of marking comprises modulating the optical signal with a low frequency dither signal, whose frequency is unique to the bundle section.

* * * * *